Dec. 18, 1973  W. R. BYRD ET AL  3,780,155

METHOD OF ASSEMBLING A CHAIR BACK

Filed March 3, 1971

Inventors
WILLIAM R. BYRD
RICHARD W. BYRD

By Charles L. Lovenbuch
Attorney

United States Patent Office 3,780,155
Patented Dec. 18, 1973

3,780,155
METHOD OF ASSEMBLING A CHAIR BACK
William R. Byrd, 4007 Venice Drive 16506, and Richard W. Byrd, 2936 W. 15th St. 16505, both of Erie, Pa.
Continuation-in-part of abandoned application Ser. No. 772,152, Oct. 31, 1968. This application Mar. 3, 1971, Ser. No. 129,963
Int. Cl. B29c 27/20; B29d 12/00
U.S. Cl. 264—230      3 Claims

ABSTRACT OF THE DISCLOSURE

A process of making a chair including molding a frame having a groove, molding a splat having a tongue, allowing the splat to cool, placing the frame in a cold liquid, supporting the frame on a support frame so that it will not distort, stretching the frame over the splat so that the tongues on the splat enter the grooves on the frame and allowing the splat and frame to cool whereby the frame and splat shrink into a tight integral form. Glue may be placed in the groove.

REFERENCE TO CO-PENDING APPLICATION

This application is a continuation-in-part of patent application, Ser. No. 772,152, filed Oct. 31, 1968, and now abandoned.

OBJECTS OF THE INVENTION

It is an object of the invention to provide an improved chair frame assembly method.

Another object of the invention is to provide an improved chair.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

DETAILED DESCRIPTION OF THE DRAWINGS

Figure 1:
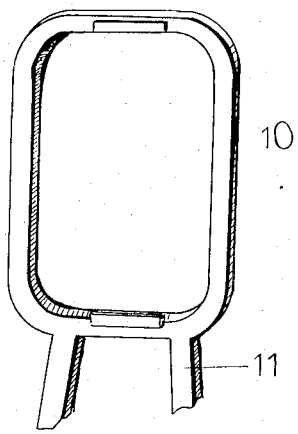
FIG. 1 is an isometric view of the frame according to the invention.
Figure 2:
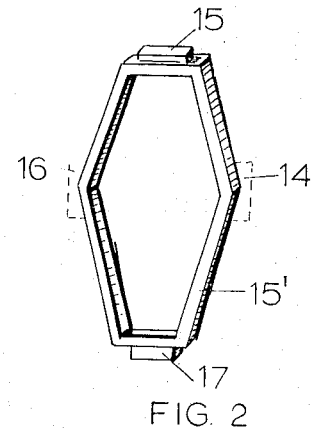
FIG. 2 is an isometric view of the splat.
Figure 3:
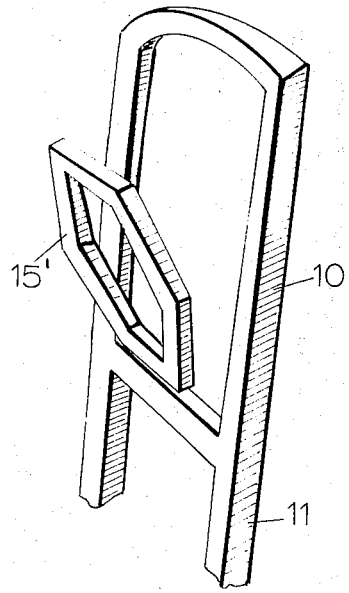
FIG. 3 is an isometric view of the splat being assembled into the frame.
Figure 4:
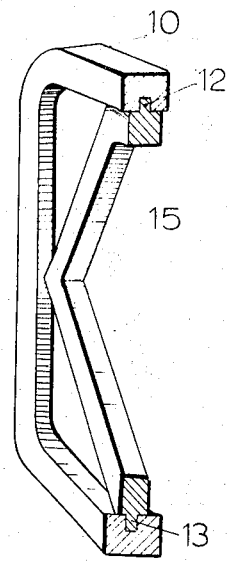
FIG. 4 is an isometric cross sectional view showing the splat assembled in the frame.

Now with more particular reference to the drawings, the frame is indicated generally at 10 and it may have legs 11 molded onto it which extend downward to engage a floor. The frame has an internal groove 12 and 13 and this groove receives the tongues 14, 15, 16 and 17. The tongues 14 and 16 are shown in phantom lines since these tongues may be deleted or the tongues 15 and 17 may be deleted and the tongues 14 and 16 be used to enter suitable grooves in the frame.

The back and splat may be molded from a thermoplastic material such as polyethylene, vinyl or any other suitable thermoplastic material. The back may be molded of a plastic material. In carrying out the process of this invention, the frame is injection molded and the back is allowed to cool in the mold to a temperature such that the outside skin of the molded back will be sufficiently rigid to allow it to be removed from the mold. In this condition, solidified skin will be approximately $\frac{1}{32}$ inch thick. The back is then placed in a cold liquid, such as water, at below 150° Fahrenheit to further thicken the solidified plastic skin to about $\frac{1}{16}$ inch. The back at this temperature will be soft and pliable. The back is then stretched around the splat 15' and then replaced in water to cool the back throughout. The back will be stretched around the outside of the splat so that the tongues 14, 15 16 and 17 enter the grooves 12 and 13 and other suitable grooves on the inside of the frame 10. These tongues will be about ¾ inch long. During the cooling operation, the frame 10 may be supported on a suitable frame to hold it rigid so that it will not warp.

The back is made of relatively thick plastic and if it were allowed to cool to form the thickened skin in the mold, shrinkage would take place. By carrying out the second stage of cooling in cold water, the shrinkage is reduced, and it is important to have relatively cold water since the cooling must be carried out rapidly.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A method of assembling a chair back by assembling a splat having relatively long spaced outwardly directed tongues into the spaced opposed relatively deep grooves in the chair frame to make said chair back comprising
   (a) placing a molten thermoplastic material in a mold for said chair frame,
   (b) cooling said thermoplastic material in said mold sufficiently for the outside skin of said thermoplastic to solidify, and the thermoplastic material within said skin to remain pliable thereby forming said chair frame,
   (c) removing said chair frame formed by said thermoplastic material from said mold,
   (d) placing said frame in water and thereby cooling said thermoplastic material to a temperature of between 200° F. and 260° F.,
   (e) stretching said frame around said splat and over said relatively long outwardly directed tongues,
   (f) fitting said relatively long outwardly directed tongues into said relatively deep grooves,
   (g) supporting said chair frame in a supporting frame to prevent warpage and cooling said chair frame whereby said chair frame shrinks onto said splat thereby forming said chair back.

2. The process recited in claim 5 wherein said skin in said mold is solidified to approximately $\frac{1}{32}''$, and said skin is solidified in said water to about $\frac{1}{16}''$.

3. The process recited in claim 2 wherein said splat has tongues which are at least ¾" long, and said tongues are inserted in internal groves in said back.

References Cited

UNITED STATES PATENTS

| | | | |
|---|---|---|---|
| 1,981,334 | 11/1934 | Schmalz | 264—230 |
| 1,220,600 | 3/1917 | Burke | 264—230 |
| 2,104,673 | 1/1938 | Rieser | 264—342 R |
| 1,721,170 | 7/1929 | Wrighton | 260—Dig. No. 47 |
| 1,510,001 | 9/1924 | Gunning | 264—230 |
| 2,356,948 | 8/1944 | Reed | 264—230 |
| 1,461,071 | 7/1923 | Schumacher | 264—230 |
| 3,064,310 | 11/1962 | Cooprider | 264—336 |

ROBERT F. WHITE, Primary Examiner

J. R. THURLOW, Assistant Examiner

U.S. Cl. X.R.

264—237, 274, 342 R, 348, DIGEST 71, 328; 297—443